(12) United States Patent
Nicaise

(10) Patent No.: US 7,643,919 B2
(45) Date of Patent: Jan. 5, 2010

(54) CRASH DETECTION SYSTEM

(75) Inventor: Jean-Louis Nicaise, Franqueville Saint Pierre (FR)

(73) Assignee: Autoliv Development AB, Vargarda (SE)

( * ) Notice: Subject to any disclaimer, the term of this patent is extended or adjusted under 35 U.S.C. 154(b) by 513 days.

(21) Appl. No.: 10/565,122

(22) PCT Filed: Jul. 16, 2004

(86) PCT No.: PCT/SE2004/001136

§ 371 (c)(1),
(2), (4) Date: Jun. 28, 2006

(87) PCT Pub. No.: WO2005/007460

PCT Pub. Date: Jan. 27, 2005

(65) Prior Publication Data

US 2007/0112491 A1    May 17, 2007

(30) Foreign Application Priority Data

Jul. 17, 2003   (GB) ................................. 0316748.3

(51) Int. Cl.
*B60R 21/01* (2006.01)
*G06F 19/00* (2006.01)
(52) U.S. Cl. ....................... 701/45; 701/301; 280/735
(58) Field of Classification Search ............... 701/1, 701/45, 41, 301; 280/735; 702/141, 142; 340/435; 342/72
See application file for complete search history.

(56) References Cited

U.S. PATENT DOCUMENTS

| 4,836,024 | A | * | 6/1989 | Woehrl et al. .............. 307/10.1 |
| 5,112,080 | A | | 5/1992 | Okano |
| 5,173,614 | A | | 12/1992 | Woehrl et al. |
| 5,202,831 | A | | 4/1993 | Blackburn et al. |
| 5,419,407 | A | | 5/1995 | Meyer et al. |
| 5,428,534 | A | | 6/1995 | Wetzel et al. |
| 5,814,897 | A | | 9/1998 | Ito et al. |
| 5,928,300 | A | | 7/1999 | Rogers et al. |
| 5,977,653 | A | | 11/1999 | Schmid et al. |
| 5,995,892 | A | * | 11/1999 | Kiribayashi et al. ........... 701/45 |
| 6,023,664 | A | * | 2/2000 | Bennet ....................... 702/141 |

(Continued)

FOREIGN PATENT DOCUMENTS

DE    3816588    11/1989

(Continued)

*Primary Examiner*—Tan Q Nguyen
(74) *Attorney, Agent, or Firm*—Brinks Hofer Gilson & Lione

(57) ABSTRACT

A crash sensor arrangement for a motor vehicle is disclosed. The crash sensor arrangement includes a first set of sensors (3,4) comprising a respective sensor on each side of the vehicle. Each sensor (3,4) is an accelerometer and has a predetermined sensing axis (5,7). Each sensor (3,4) is mounted on the vehicle (1) close to the outer skin of the vehicle and at a first longitudinal position such that the sensing axis (5,7) of each sensor (3,4) makes a predetermined angle to the longitudinal axis (6) of the vehicle (1). The predetermined angle is between 30° and 60°, or between −30° and −60°. The sensing axes (5,6) are mirror symmetrical to each other relative to the longitudinal axis (6) of the vehicle (1), so that at said first longitudinal position, there are said two respective sensors (3,4), the sensing axes of the two sensor extending in different directions.

19 Claims, 3 Drawing Sheets

U.S. PATENT DOCUMENTS

| | | | |
|---|---|---|---|
| 6,032,092 A * | 2/2000 | Laaser ..................... | 701/45 |
| 6,095,554 A | 8/2000 | Foo et al. | |
| 6,513,832 B1 * | 2/2003 | Mader et al. ............... | 280/735 |
| 2002/0145273 A1 | 10/2002 | Foo et al. | |
| 2002/0147533 A1 | 10/2002 | Foo et al. | |

FOREIGN PATENT DOCUMENTS

| | | |
|---|---|---|
| DE | 19537546 | 4/1997 |
| DE | 10142272 | 3/2003 |
| EP | 0311039 | 4/1989 |
| EP | 0 785 112 A1 | 7/1997 |
| EP | 1277623 | 1/2003 |
| GB | 2 369 473 A | 8/2000 |
| GB | 2 370 671 A | 9/2001 |
| WO | WO 96/27514 | 9/1996 |
| WO | WO 96/30231 | 10/1996 |
| WO | WO 97/22009 | 6/1997 |
| WO | WO 01/23224 A1 | 4/2001 |

* cited by examiner

CRASH DETECTION SYSTEM

CROSS REFERENCE TO RELATED APPLICATIONS

This application claims priority to Great Britain patent application 0316748.3, filed Jul. 17, 2003 and PCT/SE2004/001136, filed Jul. 16, 2004.

FIELD OF THE INVENTION

THE PRESENT INVENTION relates to a crash detection system and more particularly relates to a crash detection system adapted to be mounted on a motor vehicle such as a motor car.

BACKGROUND AND SUMMARY OF THE INVENTION

Many types of crash detection system have been proposed previously, and many crash detection systems are complex and/or expensive. The present invention seeks to provide an improved crash detection system.

According to the present invention, there is provided a crash sensor arrangement for a motor vehicle, the crash sensor arrangement including a first set of sensors having a respective sensor on each side of the vehicle, each sensor being an accelerometer having a predetermined sensing axis. Each of the sensors being mounted on the vehicle close to the outer skin of the vehicle and at a first longitudinal position such that the sensing axis of each sensor makes a predetermined angle to the longitudinal axis of the vehicle, the predetermined angle being between 30° and 60°, or between −30° and −60°, the sensing axes being mirror symmetrical to each other relative to the longitudinal axis of the vehicle, so that at the first longitudinal position, the sensing axes of the two sensors extending in different directions.

Preferably, the predetermined angle from the vehicle longitudinal axis is between 40° and 50°, or −40° and −50°.

Advantageously, the predetermined angle is substantially 45°, or −45°. An advantage of this is that the angles are orthogonal providing a very high degree of sensitivity and a good response in an impact situation.

Conveniently, the sensing axes of the sensors are directed forwardly and outwardly of the vehicle.

Preferably, in one embodiment the sensing axes are directed rearwardly and outwardly of the vehicle.

Advantageously, the sensors are mounted on the vehicle adjacent the "B" posts or pillars of the vehicle.

Conveniently, the sensors are mounted on the vehicle adjacent the "C" posts of the vehicle.

Preferably, the vehicle having sensors in accordance with this invention is additionally provided with a second set of sensors comprising two further crash sensors, mounted on respective sides of the vehicle at a second longitudinal position spaced from the first longitudinal position. The longitudinal spacing between the sensors of the first set of sensors and the sensors of the second set of sensors provide an enhanced sensitivity and helps ensure that signals of a high quality are generated which can be processed so that an appropriate signal is generated when an impact occurs.

Advantageously, each further crash sensor of the second set of sensors may be a contact sensor.

Conveniently, each crash sensor of the second set of sensors is an accelerometer located close to the outer skin of the vehicle, the sensing axis of the sensors of the second set of sensors being mirror symmetrical to each other relative to the longitudinal axis, but also extending in directions which differ from the directions of the axis of the sensors of the first set of sensors. An arrangement of this type is provided two pairs of sensors, the first pair of sensors being located at one longitudinal position and the second pair of sensors being at a second longitudinal position spaced from the first longitudinal position. The sensing axis of each pair of sensors are mirror symmetrical about the longitudinal axis. The sensors of each pair have a different sensor axis, thus providing a sophisticated and responsive sensor system.

Preferably, the accelerometer of each sensor of the second set of sensors has a sensing axis which extends substantially perpendicularly to the longitudinal axis of the vehicle.

Advantageously, each sensor of the second set of sensors is mounted on the vehicle adjacent an "A" post of the vehicle, or in a door of the vehicle.

Conveniently, the vehicle is provided with at least one front sensor.

Preferably, the vehicle is provided with two front sensors.

In one embodiment, the one or more front sensors is a contact sensor.

Alternatively, the one or more front sensors is an accelerometer.

In one arrangement, the sensing axis of each accelerometer forming a front sensor is substantially aligned with the longitudinal axis of the vehicle.

In an alternative arrangement, the sensing axis of each accelerometer forming a front sensor is between 30° and 60°, or between −30° and −60° relative to the longitudinal axis of the vehicle, the axis of the front sensors being mirror symmetric relative to the longitudinal axis of the vehicle.

Advantageously, a central control unit is provided to receive signals from the sensors and to control the deployment or actuation of one or more safety devices within the vehicle.

Conveniently, all of the sensors are located close to the outer skin of the vehicle. An advantage of an arrangement of this type is that no central sensor is required. The sensors of the arrangement are all located close to the outer skin of the vehicle, but the combination of signals generated by the sensors is capable of providing a very reliable output.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

It will be understood, from the following the description, that in none of the described embodiments is there a central accelerometer. It has been proposed, in may crash detection systems, to utilise a central accelerometer which is mounted centrally of the vehicle and which serves the function of determining the overall acceleration applied to a vehicle in an impact situation. The sensor arrangement of the present invention makes it unnecessary for there to be such a central accelerometer.

Figure 1:
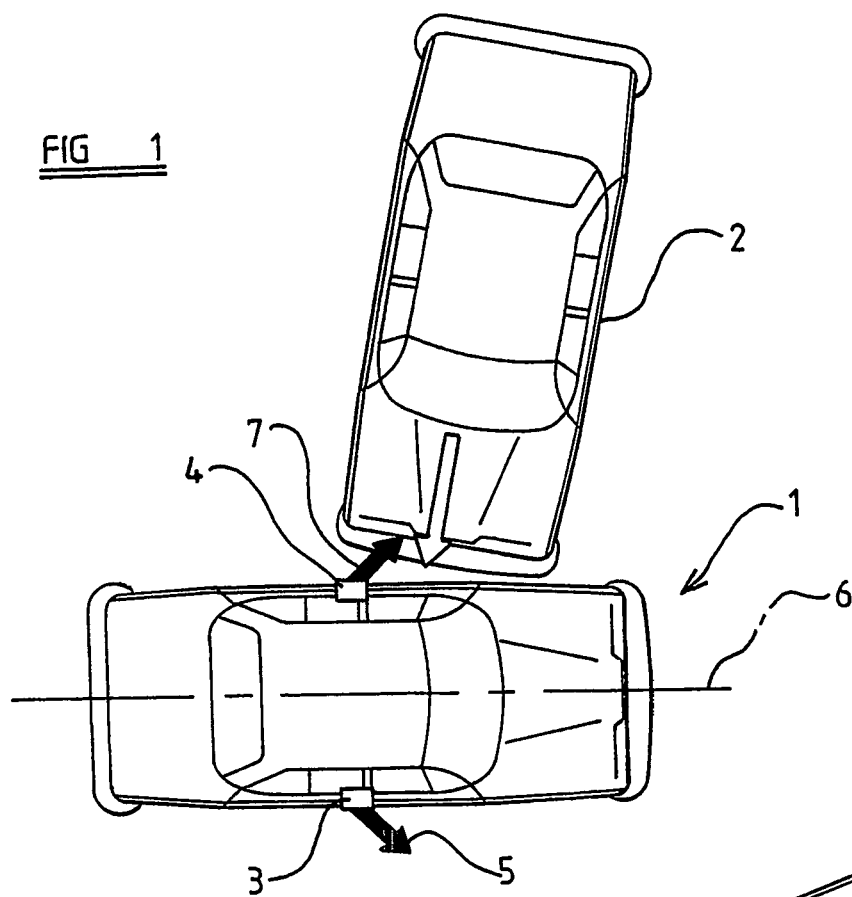
FIG. 1 is a view of a vehicle provided with a crash detection system in accordance with the invention being involved in a crash.

Referring initially to FIG. 1 of the accompanying drawings, a motor vehicle 1, provided with a sensor arrangement according to the invention is shown involved in a side impact with another vehicle 2.

The vehicle 1 is provided with two separate sensors 3 and 4, each mounted on or in the region of a "B" post or pillar of the vehicle. The sensors 3 and 4 are thus mounted on opposite sides of the vehicle. The sensor 3 is an accelerometer which is configured to determine the acceleration applied to the vehicle in the direction of a sensing axis 5. The sensing axis 5 is inclined at an angle of 45° to a longitudinal axis 6 of the vehicle with the sensing axis 5 thus being directed generally forwardly and to one side of the vehicle.

The sensor 4 is a corresponding sensor, again with a sensing axis 7 which is inclined at 45° to the longitudinal axis 6 of the vehicle, again with the sensing axis being directed forwardly and outwardly of the vehicle.

It is to be appreciated that in the described embodiment the sensing axis of the two sensors are mirror image symmetrical about the longitudinal axis 6 of the vehicle.

Here it is to be explained that the sensor in the form of an accelerometer may measure acceleration in either sense along the sensing axis. For example, if a sensor in the form of an accelerometer were positioned with the sensing axis parallel to the longitudinal axis of the vehicle, the sensor would be responsive to either forward acceleration of the vehicle or rearward acceleration of the vehicle.

In this Specification, when reference is made to a sensing axis which is inclined with a positive angle relative to the longitudinal axis of the vehicle, the angle identified is an angle measured from the longitudinal axis of the vehicle in an "outboard" sense, and thus depends upon the position of the sensor. As can be seen from FIG. 1, the sensing axis of the two sensors 5 and 7 is described, which each are inclined at 45° of the longitudinal axis of the vehicle, are directed outwardly and forwardly relative to the vehicle. Each of the axes 5 and 7 intersect the longitudinal axis 6 near the rear end of vehicle 1, defining positive angles. Of course, the axes are not unidirectional and can be considered to be extended inwardly and rearwardly of the vehicle.

It has been found that the provision of two accelerometers for sensors 3 and 4, with sensing axes as described, may be relied upon to provide adequate information concerning any impact in which the vehicle is involved. Should the vehicle be involved in a frontal impact, thus experiencing a substantial deceleration in alignment with the longitudinal axis 6 of the vehicle, components of that deceleration will be sensed equally by the sensors 3 and 4. Should the vehicle be involved in a side impact, as shown in FIG. 1, the sensor 4 would generate a very substantial signal as that sensor will be moved, as a consequence of the impact, in a direction almost in alignment with the sensing axis 7. The sensor 3, on the other hand, will generate a much lower signal since any movement imparted to the sensor 3 may be almost perpendicular to the sensing axis 5. Consequently the nature of the impact can be determined. A significant advantage of this type of arrangement is therefore that, by using only two sensors 3 and 4, an arrangement can be provided which can detect and determine both front and side impacts. It is advantageous to position the two sensors close to the outer skin of the vehicle 1 because this has been found to provide significantly improved signals in the event of a side impact than would be the case if the sensors 3 and 4 were located more centrally.

Whilst, in the described embodiment, the sensors are inclined at 45° to a longitudinal axis 6, this is the optimum position, since the sensing axis of the two sensors are orthogonal. It is believed that adequate results may be achieved if the angle of inclination is between 40° and 50° and it is also thought practicable to utilise sensors where the angle of inclination is between 30° and 60°.

Figure 2:
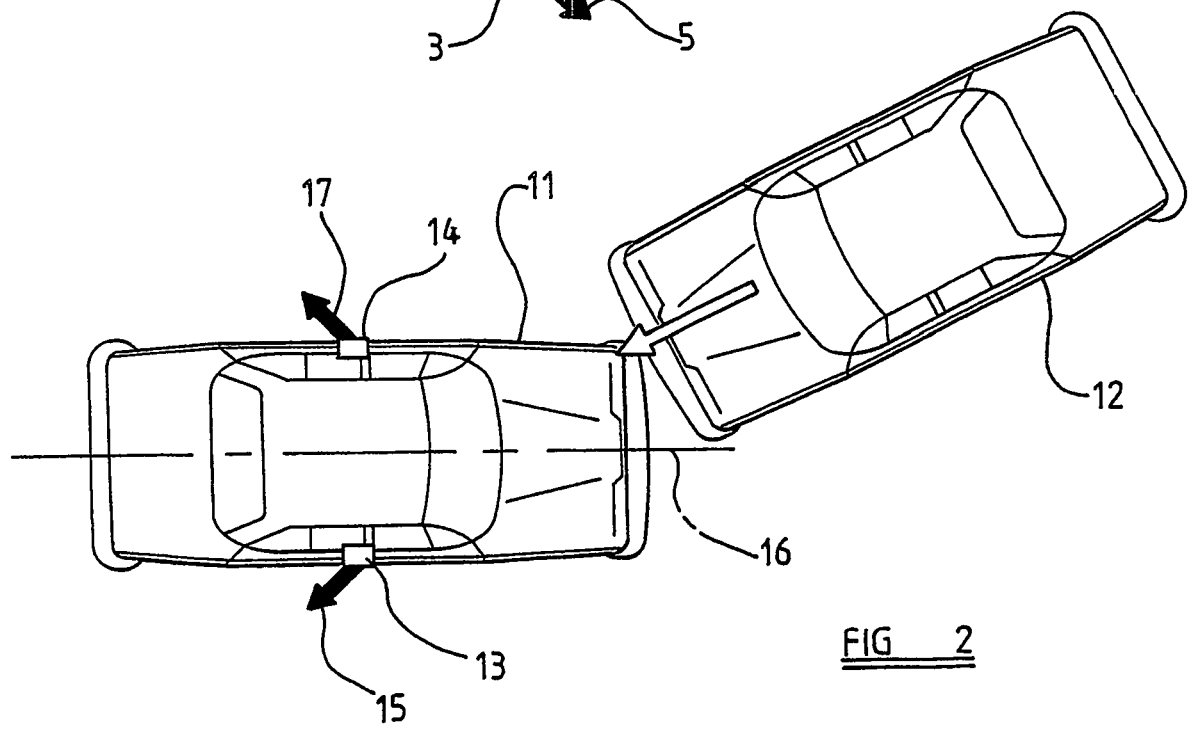
FIG. 2 is a view corresponding to FIG. 1 illustrating a second embodiment of the invention.

Whilst, in the embodiment of FIG. 1, the sensing axes 5 and 7 were directed in a positive angle direction, it is equally possible for the sensing axes to be directed in a negative angular direction. FIG. 2 illustrates an alternative embodiment of the invention in which a vehicle 11 provided with a sensor arrangement in accordance with the invention is being impacted by a second vehicle 12. The vehicle 11 is provided with a first sensor 13 provided on one side of the vehicle and a second sensor 14 provided on the opposite side of the vehicle, the sensors being mounted on the vehicle in the region of the "B" posts of the vehicle. The first sensor 13 is an accelerometer having a sensing axis 15 which is inclined, relative to the longitudinal axis 16 of the vehicle, with an angle of −45°.

Here it is to be understood that a negative angle between a sensing axis and the longitudinal axis implies that the axis is inclined to intersect the longitudinal axis at the forward region of vehicle 1, and thus may equally be considered to be inclined rearwardly and to the outboard of the vehicle 11, as shown in FIG. 2.

Similarly the sensor 14 is an accelerometer having a sensing axis 17 which again is inclined rearwardly and to the side of the vehicle making an angle of −45° to the longitudinal axis. Whilst the angle of −45° is optimum, as the sensing axis of the sensors are orthogonal alternative angles may be utilised. The sensing axes 15 and 17 shown in FIG. 2 are defined as negative angular orientations.

It is to be appreciated that in an off-set frontal impact as shown in FIG. 2, the sensor 13 would generate a high signal as the line of force of the impact is substantially aligned with the sensing axis 15 of the sensor 13. However, the sensor 14 may produce only a very low signal.

Figure 3:
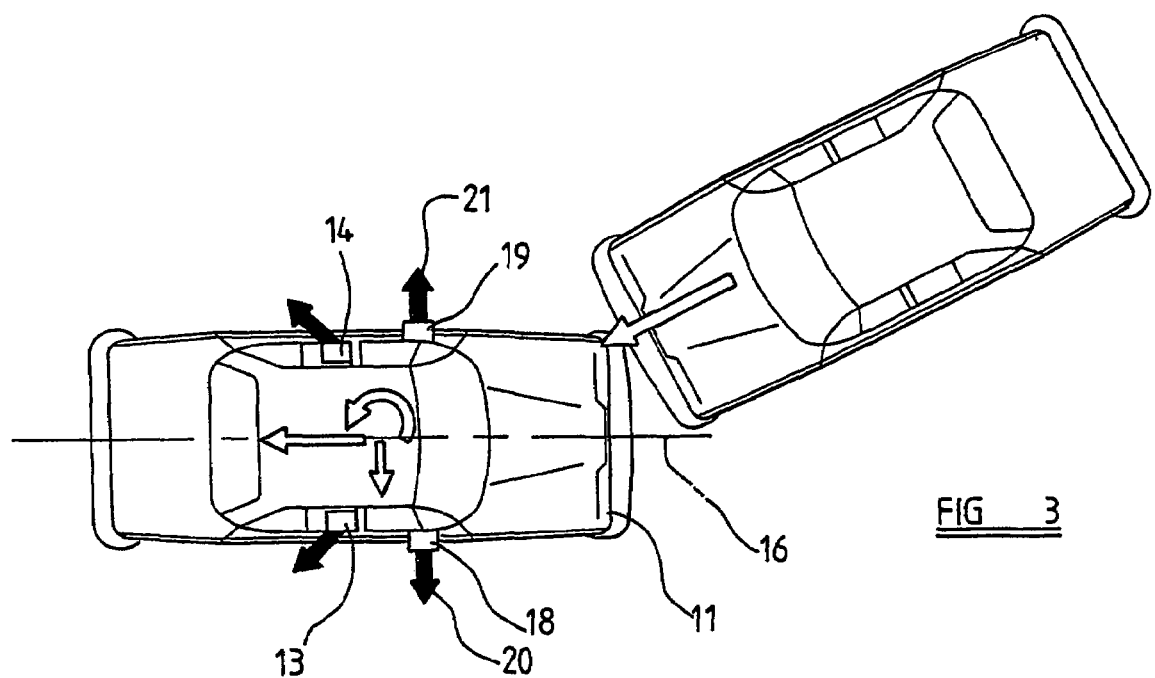
FIG. 3 is a view corresponding to FIG. 2 illustrating another embodiment of the invention.

FIG. 3 illustrates a further embodiment of the invention which is effectively a modification of the embodiment shown in FIG. 2. In the embodiment of FIG. 3 the vehicle 11 is provided, in addition to the first set of crash sensors constituted by the accelerometers 13 and 14 with a second set of sensors constituted by two further crash sensors, namely a sensor 18 provided on the first side of the vehicle and a sensor 19 mounted on the opposite side of the vehicle. The sensors 18 and 19 may be mounted adjacent the "A" posts of the vehicle 11 or in the front doors of the vehicle. The crash sensors 18 and 19 may be contact sensors, responding to an actual contact with another vehicle or object, but in the described embodiment are accelerometers. The accelerometer 18 has a sensing axis 20 which is directed perpendicularly to the longitudinal axis 16 of the vehicle, with the sensing axis 20 being directed outwardly away from the vehicle. Similarly the sensor 19 is an accelerometer having a sensing axis 21 which again is directly outwardly away from the vehicle perpendicularly to the longitudinal axis 16.

The presence of the two additional sensors 18 and 19 will enhance the sophistication of the described arrangement, and will enable more accurate assessments to be made in certain accident situations. It has been found that if the increased cost involved in providing more than two sensors can be justified for a particular vehicle installation, then the additional sensors 18 and 19 are most beneficial if they are also positioned close to the outer skin of the vehicle 11, but spaced apart. Such locations for the sensors gives more and quicker information about an impact than if a central sensor or several sensors at the same locations are used.

Figure 4:
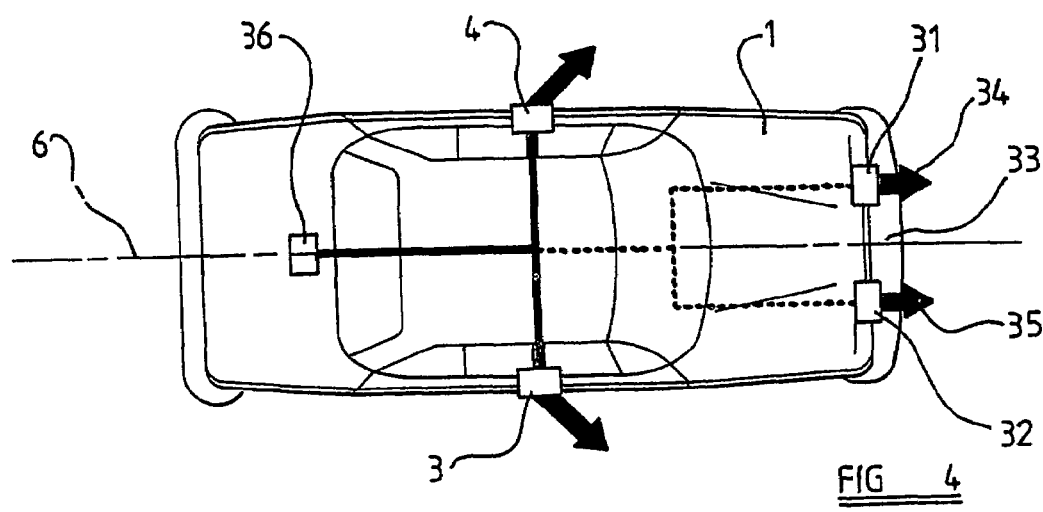
FIG. 4 is a view of a vehicle provided with a crash detection system in accordance with yet another embodiment of the invention.

FIG. 4 illustrates an embodiment of the invention which is effectively a modification of the embodiment shown in FIG. 1. In addition to the sensors 3 and 4, the vehicle 1 is provided with two further sensors 31 and 32 mounted at the front of the vehicle in association with the front bumper 33. These sensors 31 and 32 may be contact sensors, adapted to generate an output signal when the sensors actually make contact with an object, such as another vehicle, or may be accelerometers having sensing axes 34 and 35 which are aligned with the central axis 6 of the vehicle.

The various sensors are shown, in FIG. 4, as being connected to a central processing unit 36. The processing unit 36 may be located at any convenient location and will, in response to signals from the sensors, generate appropriate triggering signals to actuate safety devices present within the vehicle such as air-bags or seat belt pretensioners.

Figure 5:
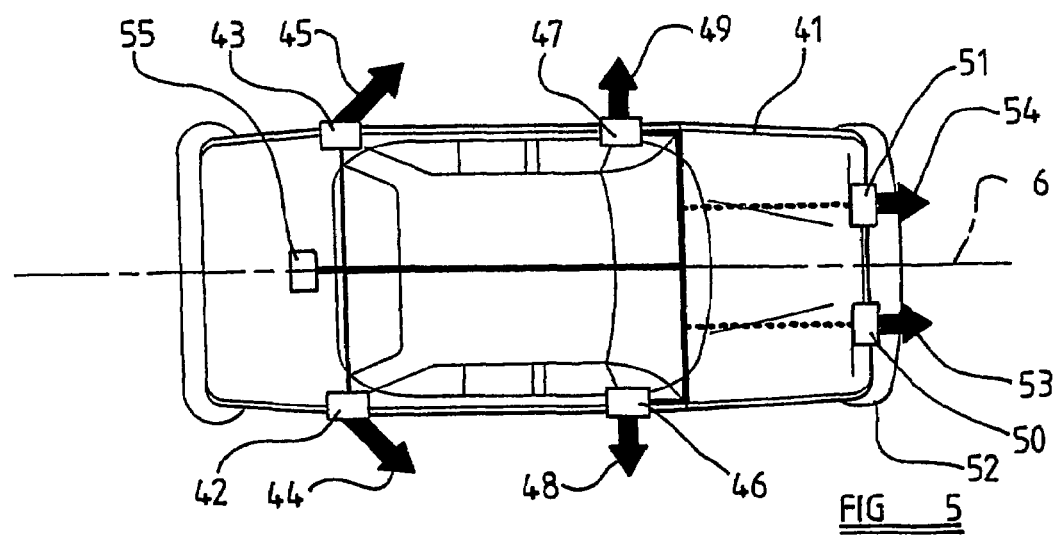
FIG. 5 is a view corresponding to FIG. 4 illustrating another vehicle provided with another crash detection system in accordance with the invention.

FIG. 5 illustrates a further embodiment of the invention. In this embodiment of the invention, a vehicle 41 is provided with a first set of sensors constituted by two side mounted sensors 42 and 43 each mounted at the base of the "C" post or pillar of the vehicle 41, the sensors being on opposite sides of the vehicle. Each sensor 42 and 43 is an accelerometer, with each accelerometer having a sensing axis 44 and 45 which makes an angle of 45° (positive) with the longitudinal axis 6 of the vehicle. Each sensing axis 44 and 45 is thus directed outwardly and forwardly of the vehicle 41. The sensing axes 44 and 45 are mirror image symmetrical about the longitudinal axis 6 of the vehicle. The vehicle 6 is provided with a second set of sensors constituted by two further sensors 46 and 47, each mounted in the front door or adjacent one of the "A" posts or pillars of the vehicle, the sensors 46 and 47 thus being on opposite sides of the vehicle. The sensors 46 and 47 may be contact sensors but are preferably accelerometers, with each accelerometer having a sensing axis 48 and 49 which is directed perpendicularly relative to the longitudinal axis 6 of the vehicle in a sense outwardly away from the vehicle.

The vehicle 41 is provided with two additional sensors 50 and 51 mounted in the region of the front bumper 52 of the vehicle. The sensors 50 and 51 may be contact sensors which respond when the vehicle makes contact with another object or may be accelerometers, in which case the accelerometers may preferably have sensing axes 53 and 54 which are substantially aligned with the longitudinal axis 6 of the vehicle. In alternative embodiments of the invention, the sensors 50 and 51 may be accelerometers which each have sensing axis which are inclined between 30° and 60°, or between −30° and −60° relative to the longitudinal axis 6 of the vehicle, the axes being mirror symmetric relative to the longitudinal axis of the vehicle.

The sensors of vehicle 41 are connected to a central control unit 55 which corresponds with the control unit 36 of the embodiment described above with reference to FIG. 4. In this embodiment it is to be noted that the sensors with the inclined sensing axes are located towards the rear of the vehicle 41.

Figure 6:
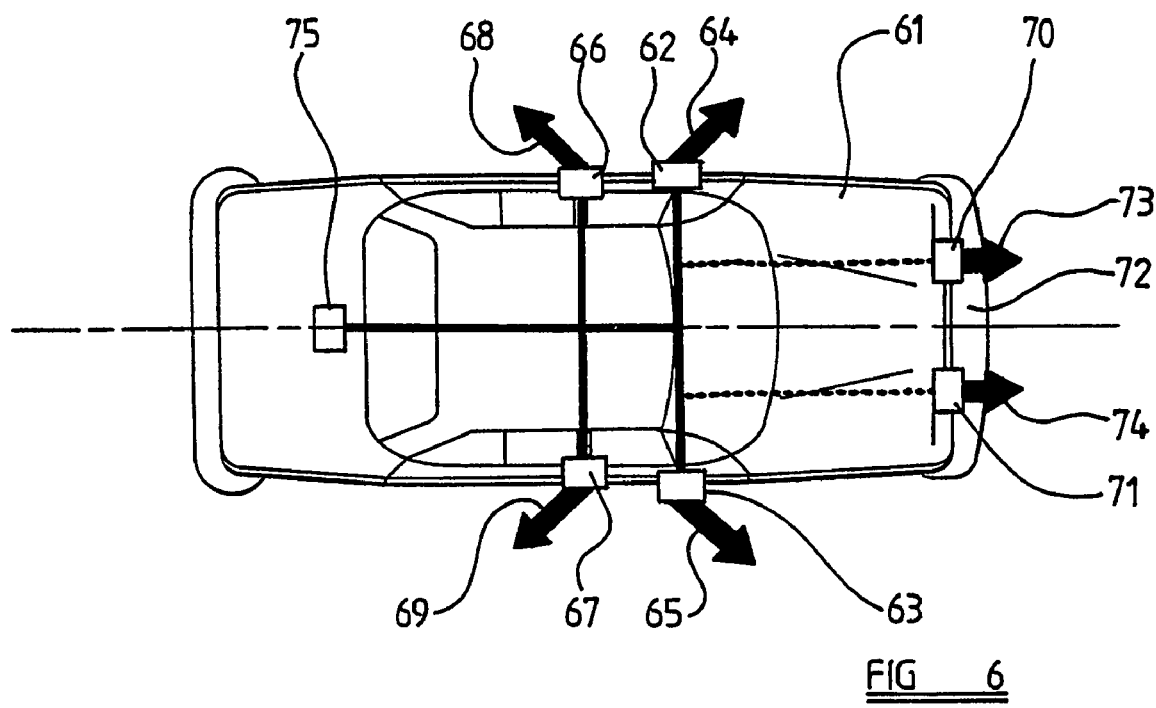
FIG. 6 is another view corresponding to FIG. 4 illustrating yet another vehicle provided with yet another crash detection system in accordance with the invention.

Referring now to FIG. 6, a further embodiment of the invention is illustrated. In this embodiment of the invention, a vehicle 61 is provided with a first set of sensors, constituted by two side mounted sensors 62 and 63, each mounted adjacent to the "A" post of the vehicle. Each sensor 62 and 63 is an accelerometer, with each accelerometer having a sensing axis 64 and 65 which makes an angle of 45° longitudinal axis of the vehicle 61. Each sensing axis 64 and 65 is thus directed in a positive angular direction as defined herein. The sensing axes are mirror image symmetrical about the longitudinal axis of the vehicle.

The vehicle 61 is provided with a second set of sensors constituted by two further sensors 66 and 67 mounted in the doors of the vehicle or adjacent the "B" post of the vehicle, on opposite sides of the vehicle. The sensors 66 and 67 in the described embodiment are accelerometers, with each accelerometer having a sensing axis 68 and 69 which makes an angle of −45° with the longitudinal axis of the vehicle. The sensing axes 60 and 69 are mirror image symmetrical about the longitudinal axis 6 of the vehicle.

The vehicle 61 is provided with two additional sensors 70 and 71 mounted in the region of the front bumper 72 of the vehicle. The sensors 70 and 71 may be contact sensors which respond when the vehicle makes contact with another object or may preferably be accelerometers, in which case the accelerometers may preferably have sensing axes 73 and 74 which are substantially aligned with the longitudinal axis 6 of the vehicle. However, the sensing axes of the accelerometer 70 and 71 may be inclined relative to the longitudinal axis of the vehicle, the angle of inclination being between 30° and 60°, positive or negative.

All of the sensors shown in FIG. 6 are connected to a central control unit 75, which corresponds with the control unit 36 of the embodiment described with reference to FIG. 4.

In all of the described embodiments the sensors are located close to the outer skin of the vehicle, and thus there is no requirement for sensors or accelerometers located in the central part of the vehicle.

Figure 7:
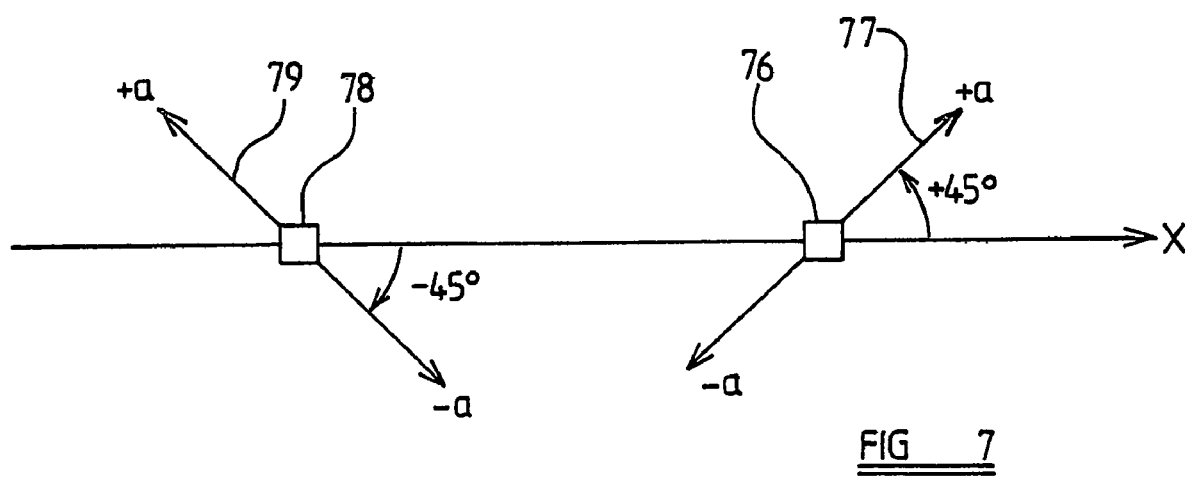
FIG. 7 is a diagrammatic illustration provided for purposes of explanation.

Referring now to FIG. 7, which is given for purposes of explanation, if the longitudinal axis of the vehicle is the axis X, and if a sensor 76, which is provided on the left hand side of the vehicle has a sensing axis 77 which makes an angle of +45° with the longitudinal axis X, then the sensor 76 may measure a positive acceleration +a in a direction which extends forwardly and outwardly of the vehicle and a negative acceleration −a in a direction which extends rearwardly and inwardly of the vehicle.

Similarly, if a second sensor 78 is provided, again mounted on the left hand side of the vehicle, with the sensor having a sensing axis 79 which makes an angle of −45°, then that sensor will sense a positive acceleration in a direction rearwardly and outwardly of the vehicle and a negative acceleration directly inwardly and forwardly of the vehicle.

While the above description constitutes the preferred embodiment of the present invention, it will be appreciated that the invention is susceptible to modification, variation and change without departing from the proper scope and fair meaning of the accompanying claims.

The invention claimed is:

1. A crash sensor arrangement for a motor vehicle defining a central longitudinal axis extending between the front and the rear of the vehicle, the crash sensor arrangement comprising a first set of sensors comprising respective sensors on each side of the vehicle spaced from the longitudinal axis, each of the sensors having one accelerometer with a predetermined sensing axis, each of the sensors being mounted on a respective "B" post on each side of the vehicle close to the outer skin of the vehicle and at a first longitudinal position relative to the longitudinal axis such that the sensing axis of each of the sensors forms a predetermined angle to the longitudinal axis of the vehicle, the predetermined angle being between 30° and 60°, or between −30° and −60°, the sensing axes of the sensors being mirror symmetrical to each other relative to the longitudinal axis of the vehicle, so that at the first longitudinal position there are only two sensors mounted on opposite sides of the vehicle, such that only one sensor, and hence only one accelerometer, is mounted on the respective "B" post on each side of the vehicle at the first longitudinal position, the sensing axes of the two sensors extending in different directions.

2. The crash sensor arrangement according to claim 1 wherein the predetermined angle is between 40° and 50°, or between −40° and −50°.

3. The crash sensor arrangement according to claim 1 wherein the predetermined angle is substantially 45°, or −45°.

4. The crash sensor arrangement according to claim 1 wherein the sensing axes of the sensors are directed in a positive angular direction.

5. The crash sensor arrangement according to claim 1 wherein the sensing axes are directed in a negative angular direction.

6. The crash sensor arrangement according to claim 1 wherein the vehicle is additionally provided with a second set of sensors comprising two further crash sensors, mounted on respective sides of the vehicle at a second longitudinal position relative to the longitudinal axis spaced from the first longitudinal position.

7. The crash sensor arrangement according to claim 6 wherein each of the crash sensors of the second set of sensors is a contact sensor.

8. The crash sensor arrangement according to claim 6 wherein each crash sensor of the second set of sensors is an accelerometer located close to the outer skin of the vehicle, the sensing axis of each of the sensors of the second set of sensors being mirror symmetrical to each other relative to the longitudinal axis, but extending in directions which differ from the sensing axes of the sensors of the first set of sensors.

9. The crash sensor arrangement according to claim 8 wherein the accelerometer of each sensor of the second set of sensors has a sensing axis which extends substantially perpendicularly to the longitudinal axis of the vehicle.

10. The crash sensor arrangement according to claim 6 wherein each sensor of the second set of sensors is mounted on the vehicle adjacent a respective "A" post on each side of the vehicle.

11. The crash sensor arrangement according claim 6 wherein each sensor of the second set of sensors is mounted in a door of the vehicle.

12. The crash sensor arrangement according to claim 1 wherein the vehicle is further provided with at least one front sensor.

13. The further crash sensor arrangement according to claim 12 wherein the front sensor is a contact sensor.

14. The crash sensor arrangement according to claim 12 wherein the front sensor is an accelerometer.

15. The crash sensor arrangement according to claim 12 wherein the sensing axis of the accelerometer forming a front sensor is substantially aligned with the longitudinal axis of the vehicle.

16. The crash sensor arrangement according to claim 1 wherein the vehicle is further provided with two front sensors.

17. The crash sensor arrangement according to claim 16 wherein the sensing axis of each accelerometer forming a front sensor is between 30° and 60°, or between −30° and −60° relative to the longitudinal axis of the vehicle, the axes of the front sensors being mirror symmetric relative to the longitudinal axis.

18. The crash sensor arrangement according to claim 1 wherein a central control unit is provided to receive signals from the sensors and to control the deployment or actuation of one or more safety devices within the vehicle.

19. The crash sensor arrangement according to claim 1 wherein each of the sensors is located close to the outer skin of the vehicle.

* * * * *